United States Patent Office 3,362,296
Patented Jan. 9, 1968

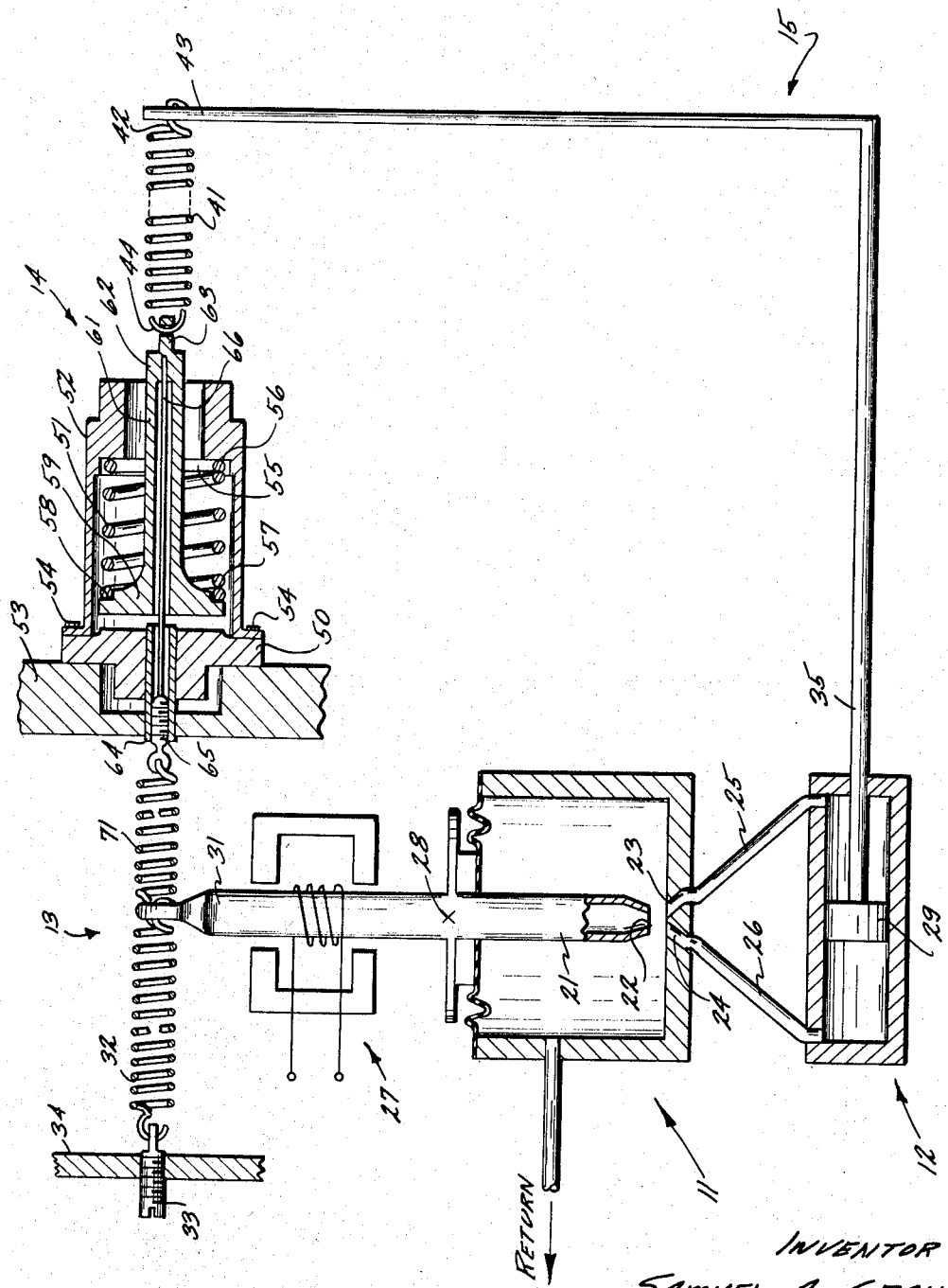

3,362,296
MECHANICAL FEEDBACK STROKE DIVIDER
Samuel A. Gray, Sun Valley, Calif., assignor to Bell Aerospace Corporation, a corporation of Delaware
Filed Aug. 20, 1965, Ser. No. 481,337
6 Claims. (Cl. 91—3)

ABSTRACT OF THE DISCLOSURE

Disclosed is a mechanical stroke reducing mechanism which includes a pair of interconnected springs having chosen spring constants and which are interconnected between a source of mechanical input signals and the mechanical input terminal of a control device such as an electrohydraeric servo valve. The stroke divider is disclosed as part of the feedback loop from an actuator to a jet pipe. The springs having the smallest spring constant is connected between the input signal source and a spring engaging means while the other spring is contained between the spring engaging means and a housing, the spring engaging means being connected also to the jet pipe. Thus movement imparted by the actuator to the first spring is reduced in amount by the second spring before application to the jet pipe.

Background of the invention

This invention relates generally to hydraeric servo-control systems and more particularly to a mechanical stroke divider for use in conjunction with applying a mechanical signal to the control member of the servo-control system. More specifically, a stroke divider mechanism in accordance with the present invention is particularly adapted for application of a mechanical feedback signal from the controlled member or actuator connected to a hydraeric servo-control system to the control member of the servo-valve included therein.

It is well known in the prior art to utilize a stroke divider mechanism particularly between the actuator and the input to the control member such as an armature of a torque motor in a servo-valve. Such stroke dividers in the prior art have, for the most part, been constructed of extremely accurate, movable, inclined planes or cam surfaces which were extremely expensive to manufacture, install, and maintain. Such prior art stroke dividers are extremely effective for the high degree of accuracy required in the systems with which they were to be utilized. However, the use of such prior art stroke dividers incurred unnecessary expense to provide accuracy beyond that needed or required in most commercial applications.

Objects of the invention

Accordingly, it is an object of the present invention to provide a mechanical stroke divider which is simple in construction, easy to assemble, requires little or no maintenance, and is inexpensive.

It is another object of the present invention to provide a mechanical stroke divider which is light in weight, rugged, useful and reliable under adverse operating conditions.

Other and more specific objects and advantages of the present invention both as to its organization and method of operation will become apparent from a consideration of the accompanying drawing which is presented by way of example only and is not intended as a limitation upon the scope of the present invention as defined in the appended claims and in which:

Brief description of the drawing

The single figure represents a schematic illustration of a hydraeric servo-control system embodying a stroke divider mechanism in accordance with the present invention, in the mechanical feedback path thereof.

Summary of the invention

A mechanical stroke divider mechanism in accordance with the present invention is adapted particularly for utilization in a servo system which includes a servo-valve having a control member for application of hydraeric fluid to an actuator and which includes means for coupling a mechanical signal to the control member within the servo-valve. The mechanical stroke divider includes first and second spring means having respectively first and second spring constants, the second spring constant being substantially larger than the first spring constant. Means is included which interconnects the first and second spring means and effectively connects the second spring means to the control member of the servo-valve. Thus, movement of the first spring in turn causes movement of the second spring by an amount which is proportional to the first spring constant divided by the second spring constant and in turn imparts movement to the control member accordingly.

Description of the preferred embodiment

Referring now to the drawing, there is therein schematically illustrated, a servo-valve 11 which drives an actuator 12. The servo-valve 11 has means 13 connected thereto for applying a mechanical input signal thereto. The means 13 for applying the mechanical signal has connected thereto a stroke divider 14 in accordance with the present invention. Particularly applicable to the stroke divider 14 in accordance with the present invention is the interconnection thereto of mechanical feedback means 15.

As is illustrated schematically, the servo-valve 11 includes a control member which may take any form desired such as for example a jet pipe 21 having an orifice 22 which is disposed above a pair of receiver ports 23 and 24. The receiver ports 23 and 24 are interconnected by means of the conduits 25 and 26 respectively to the actuator 12. Electrical input signals may be applied to the control member 21 by means of a torque motor 27 as is well known in the prior art and will not be further discussed herein. As is also well known, the control member 21 pivots about its pivot point 28 in response to the application of signals applied thereto to cause the orifice 22 of the jet pipe 21 to move with respect to the receiver ports 23 and 24 thus applying hydraeric pressure across the piston 29 of the actuator 12 causing the piston 29 to move according to the difference in pressure thereacross.

At the upper end 31 of the control member, there is provided an adjusting spring 32 which is interconnected to an adjusting means 33 such as a screw which is threaded into the housing wall 34. By adjusting the screw 33 the tension applied to the upper portion 31 of the control member by means of the spring 32 is adjusted. The spring 32 is referred to as a set point adjusting spring or a null adjusting spring. That is, as additional spring tensions or other mechanical forces are applied to the control member tending to apply forces thereto, the adjustment or null point thereof can be set by utilization of the combination of the spring 32 and screw 33 thus to enable the control member 21 to be in an essentially floating condition under quiescent operating conditions.

As is well known in the prior art, the actuator 12 having the piston 29 therein may in accordance with some desired applications produce a long stroke of the piston 29 and the rod 35 affixed thereto. It is also further known in the prior art, that it is desirable to connect the mechanical feedback signal to the control member in order to cause it to return to a null position after the actuator has assumed a given commanded position. Direct interconnection of a long stroke that may be effected by the actuator 12 to the control member is under most circumstances not practical and therefore the stroke must be divided down so that a small movement of the control member is effected even though there is a large movement of the actuator or other controlled member. Thus, a stroke divider 14 in accordance with the present invention may be inserted in the mechanical feedback path. It should also be expressly understood that the stroke divider 14 in accordance with the present invention may be utilized with any mechanical input signal which is desired and should not be limited solely to incorporation in a mechanical feedback loop although it is particularly adaptable for the same.

As is illustrated, the stroke divider 14 in accordance with the present invention includes a first spring means 41 having one end 42 thereof effectively connected to the actuator 12 as is schematically illustrated by being connected to the rigid rod 43 which is in turn connected to the actuator rod 35 and is movable with the piston 29 in response to input signals applied to the servo-valve 11 as above described.

Second spring means 51 is disposed within the cap 52 which is rigidly affixed to the housing 53 by means, for example, such as bolts 54. One end 55 of the spring 51 is seated against a shoulder 56 formed internally of one end of the cap 52. Thus, the end 55 of the spring 51 bears a fixed relationship to the housing 53. The opposite end 57 of the spring 51 is seated in a shoulder 58 formed upon an outwardly directed flange 59 which is defined by a spring engaging means such as the hollow tubular member 61 terminating at one end in the flange 59 and which is closed at the opposite end 62 thereof. At the closed end 62 there is provided means 63 for receiving the opposite end 44 of the first spring means 41.

The spring means 41 has a first predetermined spring constant while the spring means 51 has a second predetermined spring constant. The spring constant of the spring 51 is much larger than the spring constant of the spring 41. Thus, if there is a large movement of the piston 29 in the actuator 12, the spring 41 responds thereto by moving the same amount as does the actuator rod 35. The movement of the spring 41 in such a manner, for example, if moved to the right as viewed in the drawing, will place the spring 41 in tension and will apply a force to the tubular member 62. This force is directly applied to the second spring means 51 attempting to compress the same. Since the spring means 51 has a much larger spring constant than does the spring means 41, the amount of compression of the spring means 51 is directly proportional to the ratio of the spring constant of the spring 41 divided by the spring constant of the spring 51.

To apply this mechanical input signal to the control member, a direct connection from the tubular member 61 to the upper end 31 of the control member may be effected if such is desired. This may be accomplished by providing the tubular member 61 as a solid member extending through a relatively large opening in the housing wall 53 and into direct connection with the upper end 31 of the control member. It has, however, been found that it is sometimes desirable to utilize a stroke divider in accordance with the present invention under conditions necessitating an explosion proof housing for the servo-valve. Such a housing requires the movable member extending therethrough to be encompassed by the housing wall in a lap fit for a predetermined distance to preclude the propagation of any flame or explosion exterior of the housing. Under these conditions, when using a solid member alignment, problems sometimes have caused unwanted difficulties. Therefore, the spring engagement means is provided as a hollow tubular member 61. A hollow sleeve 64 is slidably disposed within an opening defined by the housing wall 53 and further extended for support purposes by bearing means 50 in a lap fit with the sleeve 64. A closure member 65 is threadably engaged to the interior portion of the hollow sleeve 64 and therefore is affixed thereto. Interconnecting the closure member 65 and the closed end 62 of the hollow tubular member 61 is a rod 66. As is illustrated, the rod 66 is of substantially smaller diameter than the inside diameter of the hollow tube 62 and the hollow sleeve 64. Thus, any misalignment between the various members may be absorbed by permitting the rod 66 to bend slightly. It should however be expressly noted that the rod 66 interconnects the tubular member 61 and the sleeve 64 to effectively provide a single substantially rigid member when in tension which operates in tension as if it were one solid member. Therefore, as the spring 51 is placed in compression by the force applied thereto through the medium of the actuator and the spring 41, the sleeve 64 moves therewith. Movement of the sleeve 64 and closure member 65 is transmitted by way of a third spring means 71 to the upper end 31 of the control member. If such is desired, the spring constant of the spring 71 can also be selected to again divide the stroke downwardly to effect the given desired movement of the orifice 22 about the receiver ports 23 and 24.

As was above pointed out, the combination of the spring 32 and the screw means 33 can be utilized, once the stroke divider 14 along with the spring 71 is connected to the upper part 31 of the control member 21, to set the control member 21 at the desired null point under quiescent conditions. Thus, the spring constants as applied to the upper portion 31 of the control member can be balanced out so that the orifice 22 under quiescent conditions is in a floating type condition and is thus responsive to any input signals that may be applied to the control member.

There has thus been disclosed a mechanical stroke divider for utilization in combination with a servo-control system which is extremely simple of construction, easy to assemble, is inexpensive, rugged, and requires little or no maintenance even under adverse operating conditions.

What is claimed is:

1. In a servo system including a servo valve having a control member for application of hydraeric fluid to an actuator and means for coupling a mechanical signal to said control member, a mechanical stroke divider connected as part of said coupling means comprising:
   (a) a housing means;
   (b) a first spring means having a first spring constant connected effectively to the source of said mechanical signal;
   (c) a second spring means having a second spring constant and having one end thereof fixed in relation to said housing;
   (d) said second spring constant being substantially larger than said first spring constant;
   (e) spring engaging means in engagement with the other end of said second spring means and said first spring means; and
   (f) means connecting said control member to said spring engaging means to transmit movement of said mechanical signal to said control member reduced by an amount proportional to said first spring constant divided by said second spring constant.

2. In a servo system including a servo valve having a control member for application of hydraeric fluid to an actuator and means for coupling a mechanical signal to said control member, a mechanical stroke divider connected as part of said coupling means comprising:
   (a) a housing means;
   (b) a first spring means having a first spring constant connected effectively to the source of said mechanical signal;

(c) a second spring means having a second spring constant and having one end thereof fixed in relation to said housing;
(d) said second spring constant being substantially larger than said first spring constant;
(e) a tubular member terminating at one end in an outwardly turned flange, the other end being closed,
   (1) the other end of said second spring means being seated on said flange;
(f) a rod member extending through said tubular member and being affixed at one end to said closed end thereof; and
(g) a third spring means connected between the other end of said rod member and said control member and having a third spring constant.

3. A mechanical stroke divider as defined in claim 2 which further includes a hollow sleeve slidably disposed in an opening defined by said housing, said rod member being affixed to and movable with said sleeve member.

4. A mechanical stroke divider as defined in claim 2 in which said first spring means is effectively connected to said actuator.

5. A mechanical stroke divider as defined in claim 2 which further includes an adjustable spring means connected between said control member and a fixed point for adjusting said control member to a null position during quiescent operating conditions.

6. A mechanical stroke divider as defined in claim 3 in which the exterior surface of said hollow sleeve engages said opening defined by said housing wall in a lap fit.

References Cited

UNITED STATES PATENTS

| 2,132,338 | 10/1938 | Ziebolz | 91—387 |
| 2,995,116 | 8/1961 | Dobbins | 91—387 |
| 3,030,928 | 4/1962 | Jaquith et al. | 91—387 |
| 3,065,735 | 11/1962 | Chaves et al. | 91—387 |
| 3,092,084 | 6/1963 | Thorner | 91—387 |

FOREIGN PATENTS

| 909,099 | 11/1945 | France. |

EDGAR W. GEOGHEGAN, *Primary Examiner.*

PAUL E. MASLOUSKY, *Examiner.*